Jan. 31, 1956 L. L. HOLZENTHAL ET AL 2,732,939
STICK REMOVER
Filed Aug. 21, 1953 2 Sheets-Sheet 1

INVENTORS
Leo L. Holzenthal
E. L. D'Aquin
E. A. Gastrock
BY J. a. Seegrist
ATTORNEY Jan. 31, 1956 L. L. HOLZENTHAL ET AL 2,732,939
STICK REMOVER
Filed Aug. 21, 1953 2 Sheets-Sheet 2

INVENTORS
Leo L. Holzenthal
E. L. D'Aquin
E. A. Gastrock
D. A. Seegrist
ATTORNEY

United States Patent Office 2,732,939
Patented Jan. 31, 1956

2,732,939

STICK REMOVER

Leo L. Holzenthal, Esler L. D'Aquin, and Edward A. Gastrock, New Orleans, La., assignors to the United States of America as represented by the Secretary of Agriculture Application August 21, 1953, Serial No. 375,844

1 Claim. (Cl. 209—102)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the cleaning of seeds or nuts such as cottonseed, peanuts, coffee beans, and the like, which, in the form in which they are harvested, are contaminated with miscellaneous foreign materials. The invention is particularly applicable to the cleaning of cottonseed.

The continuing increase in mechanical harvesting of cotton and the use of snapping, stripping and sledding methods in gathering the crop have resulted in increasing percentages of foreign matter in the seed cotton as delivered to the gins. In spite of improvements in the methods and apparatus for cleaning the seed at the gins and oil mills, a substantial proportion of foreign materials such as sticks, stems, and the like remains mixed with the seed. These types of foreign materials become comminuted by the saws of linter-removing machines and remain in the linters as contaminants which intefere with the use of the linters as starting materials for chemical processes, the use for which most of the linters are produced, even though the linters are subjected to further mechanical and pneumatic cleaning.

In general, this invention provides an apparatus for removing sticks and the like impurities from contaminated seeds, such as cottonseed, which are substantially free of large foreign particles such as grabbots, bolls, and the like, by feeding the contaminated seeds into a substantially V-shaped crevice between a row of longitudinally advancing, substantially parallel strands, which are spaced apart just far enough for seeds to freely pass between them, and the surface of a roller. The surface of the roller in contact with the strands moves in the same direction and with the same speed as the strands. The partially purified seeds that pass through the row of strands and the stick-like impurities which move along with the advancing row of strands are separately collective. Such a crevice between an advancing row of strands and the surface of a roller is hereinafter referred to as a "stick-trapping crevice." When contaminated seeds are fed into such a crevice, the surface of the roller forces the seeds through the row of strands as the strands come into contact with the roller surface while many of the stick-like contaminants which are not aligned to pass between adjacent strands are trapped between the strands and the roller surface and are pulled along with the strands as they leave the roller surface.

In the embodiments of the stick remover illustrated by the figures, a suitable frame, not shown, supports the illustrated members and a suitable power means, not shown, drives the illustrated rolls and spiral blade conveyors.

Figure 1:
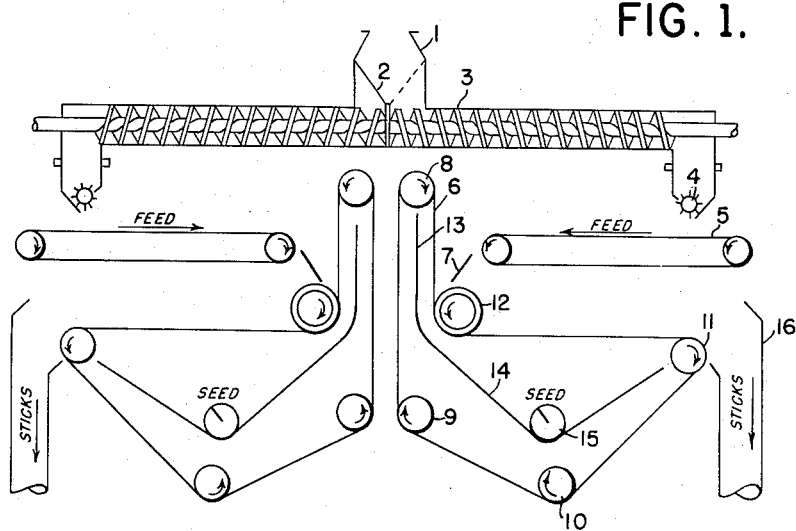
Figure 1 illustrates a cross section of one embodiment of the stick remover.
Figure 2:
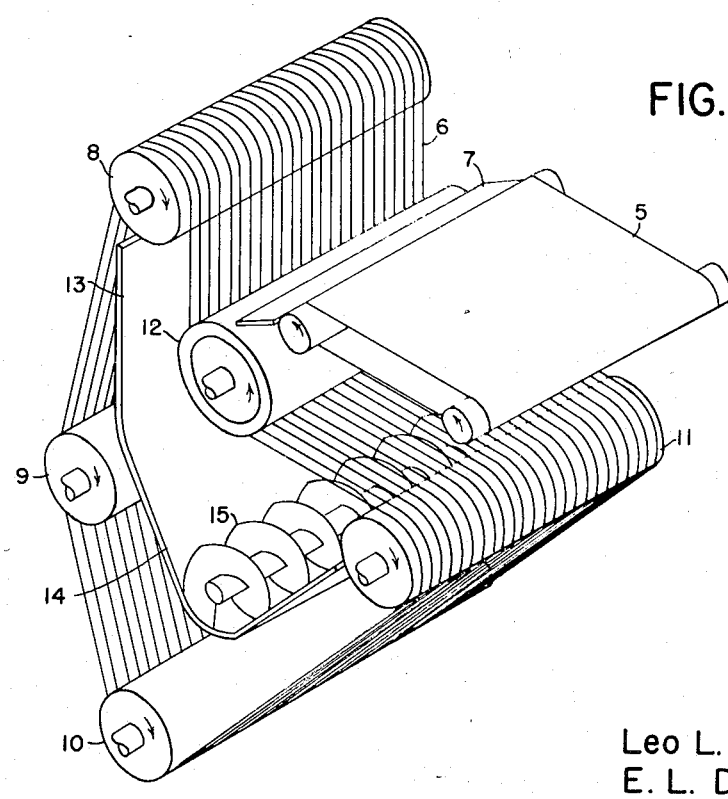
Figure 2 is an enlargement of the elements forming the stick-wrapping crevice of the stick remover.

In Figure 1, hopper 1 is adapted to receive a mixture of seeds and stick-like impurities and, by means of deflector blade 2, to direct the mixture to either side of spiral blade conveyor 3, one end of which is spiraled to move the mixture to the right and the other end to the left. The stick remover is provided with two sides for maintaining continuous operations on one side while repairs are made to the other. The two sides are similar and only one side will be described in detail.

Spiral blade conveyor 3 is arranged to convey the mixture to a spreader roll 4 which spreads the mixture in a relatively uniform layer upon an endless feed belt 5. Feed belt 5 is preferably driven at a relatively rapid rate so that the mixture is projected with an appreciable horizontal velocity against a row of substantialy parallel strands 6. Baffle plate 7 is arranged to limit the distance which the so projected seed may rebound from the contact. The row of strands 6 is advanced, in the form of an endless belt, around path defining rolls 8, 9, 10 and 11 so that in the area in which it is contacted by the mixture of cottonseeds and sticks it is advancing into contact with the surface of roller 12. Roller 12 is arranged to rotate in conjunction with the advance of the row of strands. Any suitable path defining roll 8, 9, 10 or 11 may be arranged to function as a tensioning roll.

The strands of the row of strands 6 are preferably spaced apart by a distance slightly greater than the largest dimension of the seeds being cleaned. These strands preferably have a relatively small diameter and are preferably constructed of a smooth surfaced, flexible, durable material such as a plastic or metal wire, or a smooth surfaced coil spring.

Roller 12 can be varied widely in its dimensions and can be rotated in conjunction with the advance of the row of strands by means of the row of strands, or by a suitable driving means. In the latter case the rotation of roller 12 can be used to advance the row of strands. Roller 12 can be surfaced with substantially any conventional roll surfacing material. The path defining rolls can also be used to advance the row of strands. When roll 11 is used for this purpose, tension up to the point of stick discharge is assured.

The path defining rolls 8, 9, 10 and 11 can be surfaced with any conventional roll surfacing material. At least one of these rolls is preferably surfaced with a relatively resilient material, so that substantially the same tension is applied to each strand.

When the mixture of seeds and stocks is deposited in the crevice formed by the row of strands 6 and the surface of roller 12, some of the seeds are carried through the row of strands by their horizontal momentum and the remainder of the seeds are forced between adjacent strands in the row of strands as the strands come into contact with the surface of the roller. Part of the sticks are trapped between the strands and the surface of the roller and are pulled along with the row of strands as the strands leave the surface of the roller.

Baffle 13 limits the horizontal distance that seeds passing through the row of strands 6 may travel and guides such seeds into trough 14 where they are removed by spiral blade conveyor 15. The sticks which are caused to move along with the row of strands as it leaves the surface of roller 12 are deposited in chute 16 when the row of strands is caused to move away from the direction the sticks are moving by path refining roll 11.

Figure 3:
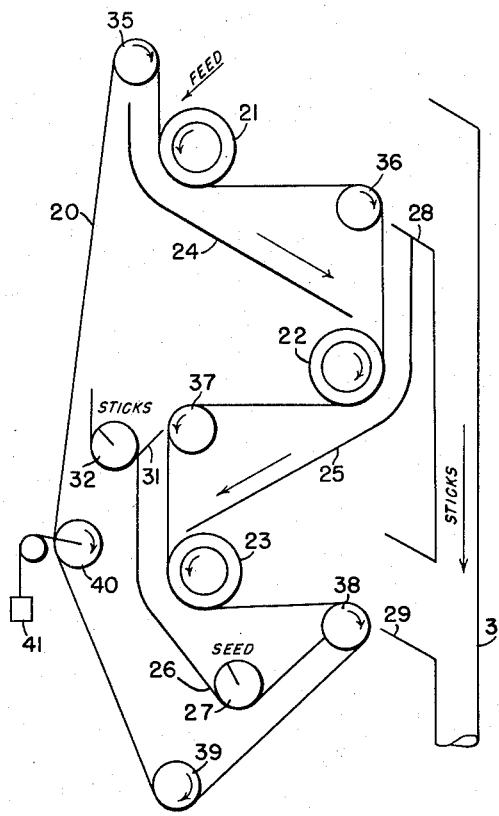
Figure 3 is a schematic illustration of a multiple pass embodiment of the stick remover.

In the embodiment illustrated in Figure 3, the row of strands 20 is arranged to form a plurality of stick-trapping crevices with rollers 21, 22 and 23 at three different heights. The mixture of seeds and sticks is preferably fed into the uppermost crevice by a feeder such as is illustrated in Figure 1. Baffle 24 guides the seed portion of the mixture which passes through the row of strands into the next lower stick trapping crevice. Baffle 25 guides the seed portion which passes through the row of strands at this level into the lowermost of the stick-trapping crevices. The seed portion passing through the row of strands at the lowermost stick-trapping crevice is collected in trough 26 from which it is removed by spiral blade conveyor 27. The sticks removed at the uppermost stick-trapping crevice, along with those removed at the lowest crevice are guided by baffles 28 and 29 into stick chute 30. The sticks removed at the middle stick-trapping crevice are collected in trough 31 from which they are removed by spiral blade conveyor 32. Proper tension of the row of strands 20 as it passes over the rollers 21, 22 and 23 and path defining rolls 35, 36, 37, 38 and 39 is provided by weight 41 arranged to impart tension to the row of strands 20 by means of tensioning roll 40.

Figure 4:
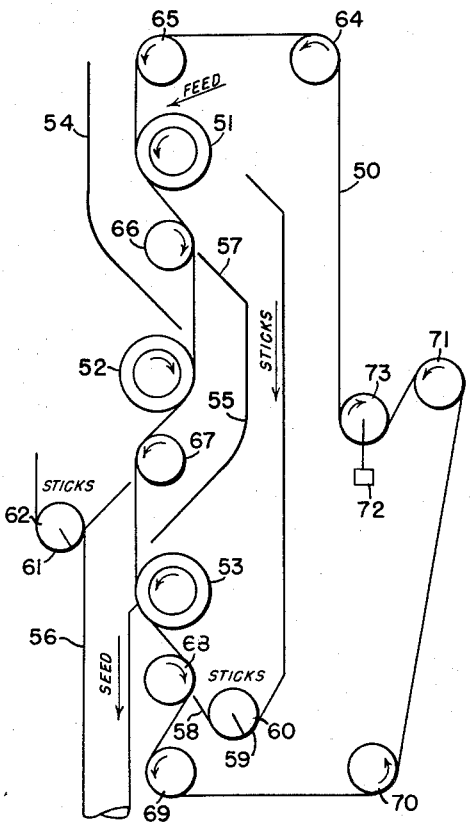
Figure 4 is a schematic illustration of another multiple pass embodiment of the stick remover.

In the embodiment of the stick-trapping devices illustrated in Figure 4, the row of strands 50 is arranged to form a stick-trapping crevice with a plurality of rollers 51, 52 and 53 at three different heights. The mixture of seeds and sticks is preferably fed into the uppermost stick-trapping crevice by a feeding arrangement such as is illustrated in Figure 1. Baffle 54 guides the seed portion of the mixture which passes through the row of strands at the uppermost stick-trapping crevice into the next lower stick-trapping crevice. Baffle 55 guides the portion which passes through the row of strands at this level into the lowermost stick-trapping crevice. The seed portion of the mixture which passes through the row of strands at the lowermost stick-trapping crevice is collected in chute 56. The sticks removed at the upper stick-trapping crevice along with those removed at the lowest crevice are guided by baffles 57 and 58 into trough 59 from which they are removed by spiral blade conveyor 60. The sticks removed at the middle stick-trapping crevice are collected in trough 61 where they are removed by spiral blade conveyor 62. Proper tension of the row of strands 50 as it passes over rollers 51, 52 and 53 and the path defining rolls 64, 65, 66, 67, 68, 69, 70 and 71 is provided by weight 72 arranged to impart tension to the row of strands by means of tensioning roll 73.

Figure 5:
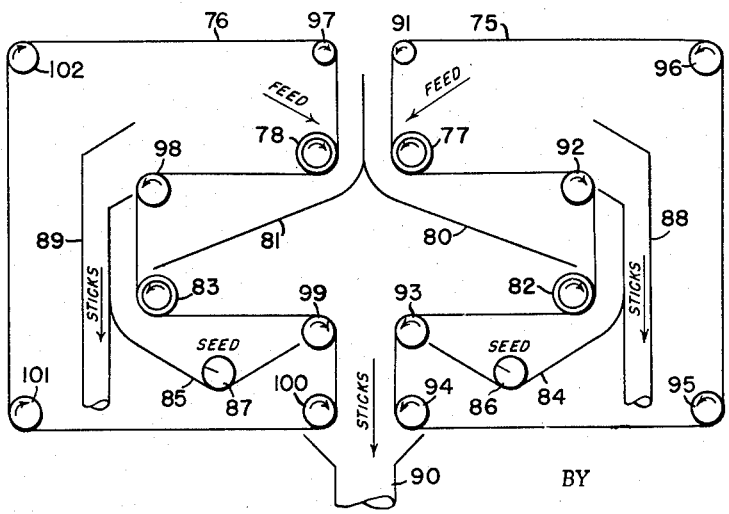
Figure 5 is a schematic illustration of another multiple pass embodiment of the stick remover.

In the embodiment of the stick-trapping machine illustrated in Figure 5, two pairs of stick-trapping crevices are arranged at two heights to provide a relatively compact machine of high capacity. The mixture of cottonseeds and sticks is preferably fed into the upper stick-trapping crevices provided by rows of strands 75 and 76 and rollers 77 and 78 by the feeding arrangement illustrated in Figure 1. Baffles 80 and 81 guide the seed portion of the mixture which passes through the row of strands at the upper stick-trapping crevice to the lower stick-trapping crevice provided by the strands and rollers 82 and 83. The seed portion which passes through the row of strands at the lower crevices is collected in troughs 84 and 85 from which they are removed by spiral blade conveyors 86 and 87. The sticks removed at the upper stick-trapping crevices are collected in chutes 88 and 89, and those removed at the lower stick-trapping crevices are collected in chute 90. Any suitable path defining roll of rolls 91, 92, 93, 94, 95 and 96 and any one of rolls 97, 98, 99, 100, 101 and 102 may be mounted to act as tensioning rolls.

The stick removing machines provided by this invention can be used in conjunction with one or more other cottonseed cleaning or delintering machines. They can be adapted to remove impurities other than sticks by incorporating elements for removing various contaminants from the seed portions which pass through the row of strands of one or more at the stick-trapping crevices. The machines are particularly suited for cleaning cottonseed from which grabbots, bolls and large foreign particles other than sticks, stems, branches and the like have been removed. The machines are even more applicable and effective when stick-contaminated cottonseed from which first-cut linters have been removed constitutes the feed.

We claim:

A machine for removing stick-like impurities from contaminated seeds comprising: a row of substantially parallel endless strands; means for supporting and for longitudinally advancing said strands; at least one roller having its axis perpendicular to and a portion of its surface in contact with said strands; means for rotatably supporting said roller so that its surface in contact with the strands moves in the same direction and with the same speed as said strands; means for feeding contaminated seeds into the crevice between the adjacent surfaces of said strands and the surface of said roller as they advance into contact so that the roller forces the seeds through said row of strands and the impurities move along with the row of strands; and means for collecting the purified seeds which pass through said row of strands.

References Cited in the file of this patent
UNITED STATES PATENTS
2,617,532   Gorton _____ Nov. 11, 1952